Aug. 31, 1926.
L. SAIVES
1,597,831
BRAKE FOR RAIL VEHICLES
Filed June 11, 1924    2 Sheets-Sheet 2
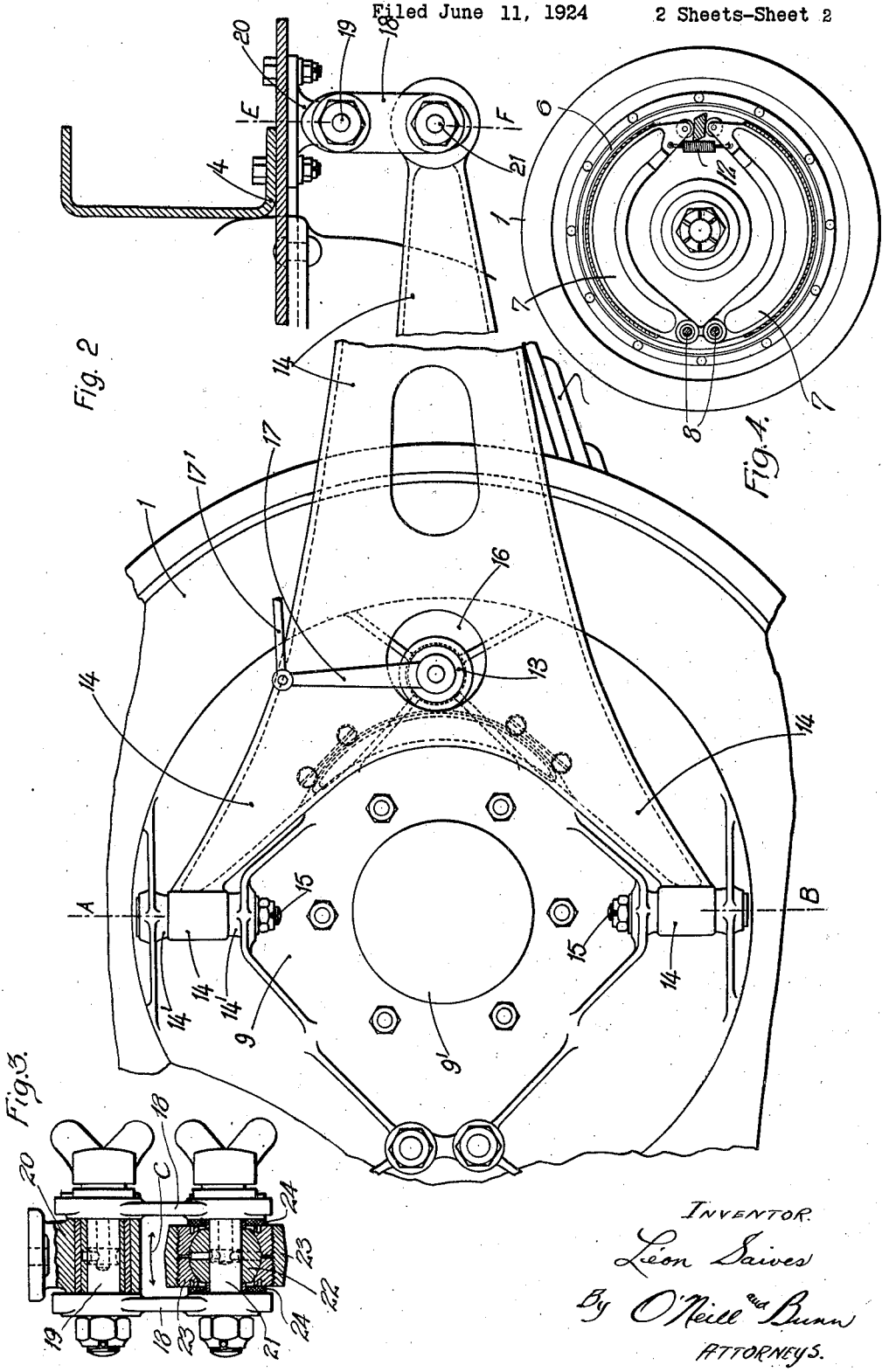
INVENTOR.
Léon Saives
By O'Neill and Bunn
ATTORNEYS.

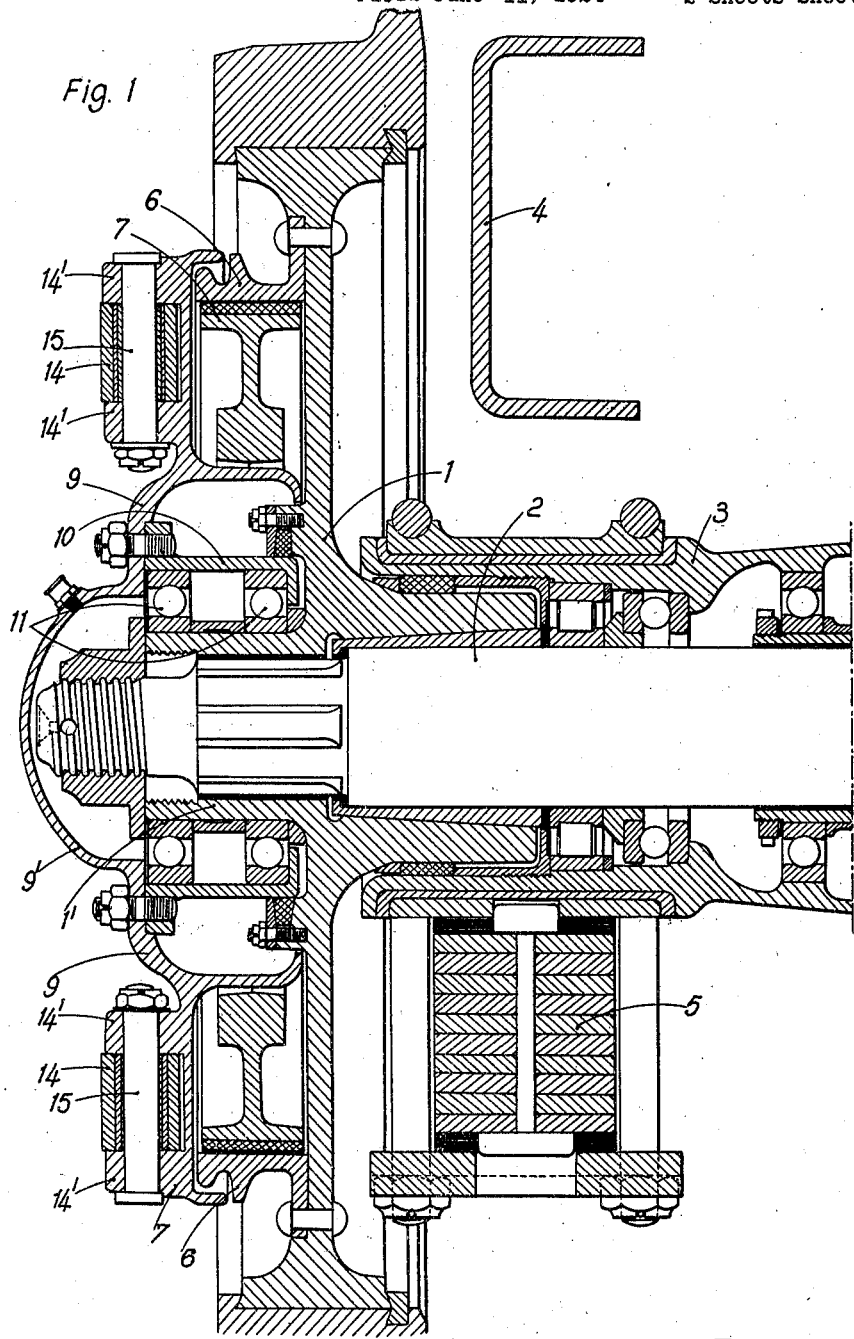

Patented Aug. 31, 1926.

1,597,831

UNITED STATES PATENT OFFICE.

LEON SAIVES, OF BILLANCOURT, FRANCE, ASSIGNOR TO LOUIS RENAULT, OF BILLANCOURT, FRANCE.

BRAKE FOR RAIL VEHICLES.

Application filed June 11, 1924. Serial No. 719,302, and in France September 6, 1923.

The invention relates to a brake mechanism, especially adapted to railway vehicles, and has for its object to provide a simple, durable, and efficient brake of the drum and interior expansible shoe type to be applied to the outer face of a car wheel, as will be more particularly described in the following specification and the accompanying drawings, in which:—

Fig. 1 is a transverse sectional elevation on the line A—B of Fig. 2.

Fig. 2 is a side elevation.

Fig. 3 is a sectional elevation on the line E—F of Fig. 2.

Fig. 4 is a sectional side elevation of the wheel and brake.

Referring to the figures, the driving wheel to which the arrangement is applied is shown at 1, and is integral with the driving shaft 2 of the vehicle, which is journalled in a housing 3 attached to the vehicle frame 4 by springs 5.

The braking arrangement, attached outside the wheel 1, comprises the following members: on the wheel disc there is riveted the brake-drum 6, on the inner periphery of which the brake-segments 7—7 (Fig. 4) are applied as usual. The studs 8—8 of the segments, as well as the axle of the control-cam 12, are attached to a member 9 centered on the outer part of the wheel-boss 1', a ball bearing 11 being provided between the boss and a concentric cylindrical member 10 integral with 9.

The member 9 of circular shape comprises a central part 9', constituting a cap for the boss, cast integrally therewith and disposed on opposite sides of the center thereof are provided ribbed supports 14', between which are located the sleeve-shaped ends of the strut 14; each of these supports is perpendicular to the axis of the shaft 2, and they are traversed, together with the ends of the strut, by pivot bolts 15.

The strut 14 because of this method of attachment constitutes a jointed fork; at its opposite end the strut is attached to the frame 4 by special double shackles 18, the upper pin 19 of which is hung to a suitable bracket 20, rigidly fixed to the frame 4. This joint 19 is straight and practically parallel with the axle; the lower joint on the contrary is of the ball and socket type and comprises the pin 21, the spherical caps 23 and the corresponding ball 22; felt washers 24 complete the ball and socket joint.

At a suitable place in the strut 14 there is made an aperture 16, through which the shaft controlling the operating cam 12 can pass, said shaft being keyed to the control-lever 17, connected to the pull-rod 17'.

Considering the operation of the device it is evident (1) that when the brakes are operated, the member 9 centered on the boss of the wheel will not rotate owing to its connection with the strut 14; (2) that this strut will be able easily, and without giving rise to abnormal strains, to follow all displacements of the axle with respect to the frame in consequence of the joints described; the ball and socket joint at the lower part of the double shackles 18 allowing displacements as shown by the arrows C.

I claim as my invention—

A railway car wheel brake comprising a brake drum adapted to be fixed to the outer edge of the wheel web, a circular frame loosely mounted on the outer portion of the wheel hub, circumferentially expansible brake shoes within the drum, pivot pins for said shoes carried by said frame, a shoe operating cam carried by said frame, means for operating said cam, a forked strut, vertically disposed hinged connections between the forks of said strut at diametrically opposite points on the outer face of said frame, and a shackle including a universal joint for connecting the outer ends of the strut with the vehicle frame.

In testimony whereof I affix my signature.

LEON SAIVES.